April 19, 1949.  N. A. TORNBLOM  2,467,639

BOX COVER WITH FIXTURE SUPPORT

Filed Dec. 5, 1945

Inventor:
Nils A. Tornblom
By Wm. H. Freudenreich
Attorney

Patented Apr. 19, 1949

2,467,639

UNITED STATES PATENT OFFICE 2,467,639

BOX COVER WITH FIXTURE SUPPORT

Nils A. Tornblom, Chicago, Ill., assignor to Appleton Electric Company, a corporation of Illinois Application December 5, 1945, Serial No. 632,947

2 Claims. (Cl. 248—343)

Covers for outlet boxes are sometimes provided with devices, connected therewith by ball and socket joints of large diameter, from which fixtures are suspended. Heretofore such structures have been so designed that a large portion of the ball member projects far into the box to which the cover is applied, thus taking up space that could be usefully employed for other purposes.

The primary object of the present invention is to produce a simple, novel and compact combination with a box cover of a swivel fixture support no part of which protrudes materially beyond the top or back face of the cover when the fixture support is in a normal central position with its axis at right angles to the plane of the cover.

A further object of the present invention is to provide my new composite structure with simple and novel cushioning means for a fixture or other object which is being suspended from the cover.

Figure 1:
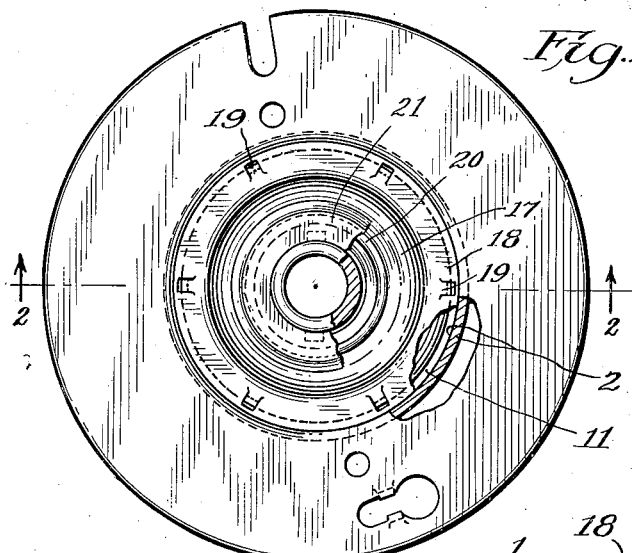
Figure 4:
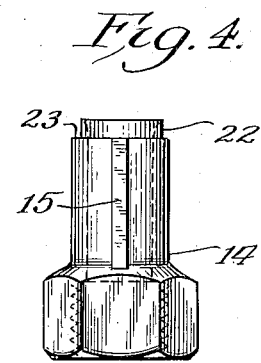
Figure 2:
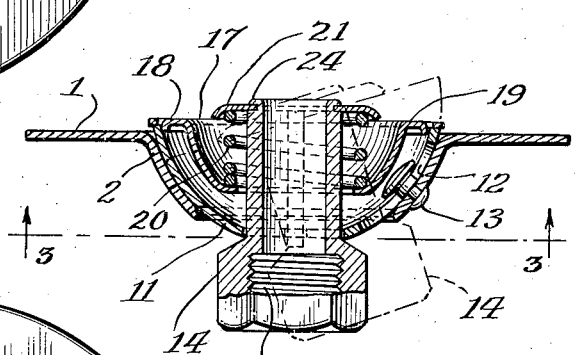
Figure 3:
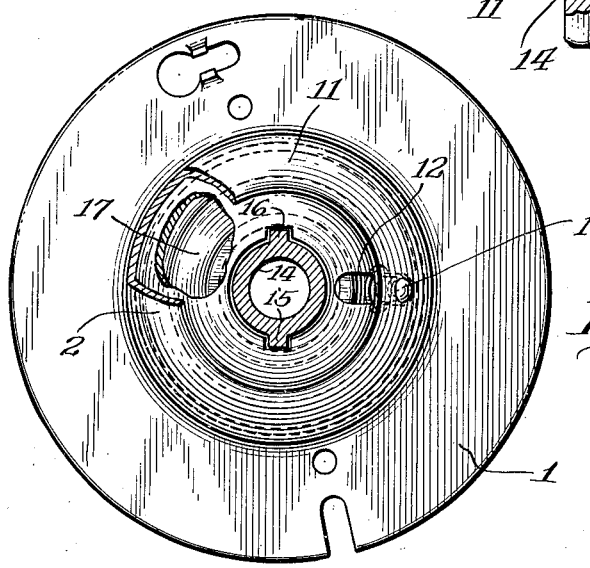

The various features of novelty whereby the present invention is characterized will hereinafter be pointed out with particularity in the appended claims; but, for a full understanding of the invention and of its objects and advantages, reference may be had to the following detailed description taken in connection with the accompanying drawings, wherein:

Figure 1 is a plan view of a construction embodying the present invention, a fragment of the cover being broken out; Fig. 2 is a section on line 2—2 of Fig. 1, with the attachment shown swung to one side, in broken lines; Fig. 3 is a section on line 3—3 of Fig. 2, fragments of the cover and the ball member being broken away; and Fig. 4 is an elevational view of the stud member, detached from the cover.

Referring to the drawings, I represents any usual or suitable cover for an outlet box or the like, usually a sheet metal stamping. The central portion of the cover is cut out and deformed to produce a truncated hemisphere, namely, a belt 2, on one side of and adjacent to the equator of a sphere relatively large in diameter, protruding from the outer face of the cover; this being the socket of a ball and socket joint. Resting in the socket, is a cooperating ball member 11.

The ball member 11 is a truncated hemisphere, preferably formed of sheet metal and containing a slot 12 following a great circle and completely surrounded by metal. A rivet 13 is fixed in the socket member and extends through the slot. A tubular stem 14 extends up through the central hole in the ball member and has at its lower end an internal screw thread 5 for the attachment of a fixture thereto. The body portion of member 14 has two long keys 15 extending lengthwise thereof on opposite sides; these keys fitting slidably in notches 16 opening out of the central hole in the ball member, as best shown in Fig. 3. Nested within the ball member is a shallower dish shaped element 17 having a peripheral flange 18 that rests on the edge or rim of the cup-shaped ball; this flange preferably having little lugs 19 punched downwardly therefrom to enter the cavity in the ball and engage with the inner face of the wall thereof and thus hold element 17 centered. A compression spring 20 surrounds the upper part of member 14 and rests at its lower end on the bottom of the dish 17. Secured to the upper end of the member 14 is a washer 21 that rests on top of the spring and thus holds member 14 raised, while permitting it to be pulled down against the resistance of the spring. Member 21 can conveniently be attached to member 14 by reducing the upper end in diameter as indicated at 22 in Fig. 4, placing member 21 on the reduced part so as to rest on the annular shoulder 23 at the lower end of reduced section 22, and then peening the extreme upper end of member 14, as shown in Fig. 2, to form a flange 24 overlying washer member 21. After the parts have been secured together as just explained, they cannot become completely separated from each other, accidentally or intentionally, unless the rivet and flange 24 are cut away.

In this construction the fixture support as a whole has the capacity for universal swinging movements; the tubular part 14 being adapted to move lengthwise, against the resistance of the spring, relatively to the remainder of the device. It will also be seen that, although the open top of the ball member, proper, is closed, there is no objectionable upward projection from the center of the cover, at any time, so that objects in a box to which the cover is attached may extend close to the plane of the cover at the center of the latter. Consequently, the presence of the fixture support does not interfere objectionably in the matter of positioning wiring and other devices in a box just as is done when an ordinary plain cover is used.

While I have illustrated and described with particularity only a single preferred form of my invention, I do not desire to be limited to the precise details thus illustrated and described; but intend to cover all forms and arrangements that come within the definitions of my invention constituting the appended claims.

I claim:

1. In combination, a flat box cover containing the socket member of a ball and socket joint, said socket member being in the form of a truncated hemispherical shell having its large end in the plane of the cover, a ball member in the form of a hemispherical cup nested in said socket, a stem extending radially of and slidable lengthwise in the ball member and outwardly through the opening at the smaller end of the socket, a spring in the ball member yieldingly supporting the stem, the stem being substantially smaller in diameter than said opening, and a loose pin and slot connection between the socket member and the ball member to hold them in contact with each other while at all times permitting the stem to swing laterally in any direction, the pin projecting from one of said members through the slot in the other member and having a head that overlaps the portions of the latter located beside the slot.

2. In combination, a flat box cover containing the socket member of a ball and socket joint, said socket member being in the form of a truncated hemispherical shell below and having its large end in the plane of the cover, a ball member in the form of a truncated hemispherical shell nested in the socket member, the ball member being deeper than the socket member so that its small end protrudes through the opening in the small end of the socket member, a dish shaped member, shallower than the ball member, nested in the ball member and having a part resting on the rim of the latter, a stem-like fixture support extending through the opening in the smaller end of the ball member and movable lengthwise within the same, the said fixture support having at its upper end a lateral projection, a compression spring surrounding the fixture support and bearing at its ends against said projection and the bottom of the dish shaped member, respectively, and means fastening the ball and socket members together for limited relative movements about their common center.

NILS A. TORNBLOM.

REFERENCES CITED

The following references are of record in the file of this patent:

UNITED STATES PATENTS

| Number | Name | Date |
| --- | --- | --- |
| 1,030,007 | Miller | June 18, 1912 |
| 1,304,561 | Gulesian | May 27, 1919 |
| 1,309,052 | Worrell | July 8, 1919 |
| 1,635,468 | Dodge | July 12, 1927 |